(12) United States Patent
Blasczak et al.

(10) Patent No.: US 12,450,459 B1
(45) Date of Patent: Oct. 21, 2025

(54) DEVICES AND METHODS FOR PROVIDING ACOUSTIC SIGNALS

(71) Applicant: Zebra Technologies Corporation, Lincolnshire, IL (US)

(72) Inventors: Matthew D. Blasczak, Shirley, NY (US); Matthew Lawrence Horner, Sound Beach, NY (US); Heng Tian, South Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/901,080

(22) Filed: Sep. 30, 2024

(51) Int. Cl.
*G06K 7/14* (2006.01)
*G06K 7/10* (2006.01)
(52) U.S. Cl.
CPC . *G06K 7/1417* (2013.01); *G06K 2007/10524* (2013.01)

(58) Field of Classification Search
CPC .................. G06K 7/1417; G06K 2007/10524
USPC ..................................... 235/462.45
See application file for complete search history.

(56) References Cited

U.S. PATENT DOCUMENTS

2013/0177455 A1\* 7/2013 Kamen .................. G16H 20/17
417/313

\* cited by examiner

*Primary Examiner* — Toan C Ly
(74) *Attorney, Agent, or Firm* — Yuri Astvatsaturov

(57) ABSTRACT

Devices and methods for providing acoustic signals are disclosed herein. An example method includes receiving an indication of an acoustic signal initiation action for an imaging device, and retrieving, based on the indication, an acoustic signal file from a memory of the imaging device. The example method further includes causing the imaging device to emit an acoustic signal indicated by the acoustic signal file. The acoustic signal includes a monotonic sweep across a plurality of frequencies that begins at a first frequency and ends at a second frequency that is different from the first frequency.

20 Claims, 5 Drawing Sheets

DEVICES AND METHODS FOR PROVIDING ACOUSTIC SIGNALS

BACKGROUND

An imaging device providing audible feedback to indicate a successful scan is a common practice. This feedback is typically generated by an audio output device (e.g., beeper, speaker, piezo transducer) of the imaging device, producing a "beep" sound at a sound pressure level (SPL) measured in decibels (dB). However, achieving a consistent SPL across different imaging devices can be challenging due to variations in the acoustic design and mechanical components surrounding the audio output device, and these variations cause discrepancies in the imaging device frequency response curve which impact the effectiveness and consistency of the audible feedback provided.

Furthermore, the selection of fixed tones (e.g., low, medium, high) to meet SPL specifications presents difficulties, particularly when the imaging device's acoustic resonance width is narrow and the variability between devices is significant. In these situations, ensuring that each tone maintains acceptable SPL levels across all imaging devices is a complex task. These situations are further complicated by late-stage or post-release mechanical design changes, which can alter the acoustic properties of the imaging device and necessitate software adjustments to maintain desired SPL levels. Such adjustments can be resource-intensive and may not always be feasible within the constraints of a device's development cycle.

SUMMARY

In some aspects, the techniques described herein relate to a method for providing acoustic signals, the method including: receiving, at one or more processors, an indication of an acoustic signal initiation action for an imaging device; retrieving, by the one or more processors based on the indication, an acoustic signal file from a memory of the imaging device; and causing, by the one or more processors, the imaging device to emit an acoustic signal indicated by the acoustic signal file, wherein the acoustic signal includes a monotonic sweep across a plurality of frequencies that begins at a first frequency and ends at a second frequency that is different from the first frequency.

In some aspects, the techniques described herein relate to a method, wherein the plurality of frequencies includes one or more frequencies between the first frequency and the second frequency.

In some aspects, the techniques described herein relate to a method, wherein the first frequency is less than the second frequency or the first frequency is greater than the second frequency.

In some aspects, the techniques described herein relate to a method, wherein the acoustic signal further includes a reverse monotonic sweep across the plurality of frequencies that begins at the second frequency and ends at the first frequency.

In some aspects, the techniques described herein relate to a method, wherein emitting the acoustic signal further includes: performing the monotonic sweep before the reverse monotonic sweep; or performing the reverse monotonic sweep before the monotonic sweep.

In some aspects, the techniques described herein relate to a method, wherein at least one frequency included in the plurality of frequencies corresponds to an optimal sound pressure level (SPL) amplitude for the imaging device.

In some aspects, the techniques described herein relate to a method, wherein the acoustic signal file is stored in a non-overwritable location within the memory of the imaging device.

In some aspects, the techniques described herein relate to a method, wherein the imaging device includes a beeper and a beeper drive circuit, and the method further includes: causing, by the one or more processors based on the acoustic signal file, the beeper to emit the acoustic signal by providing a plurality of square waves with frequencies corresponding to the plurality of frequencies as inputs to the beeper drive circuit.

In some aspects, the techniques described herein relate to a method, wherein the imaging device includes a speaker and an audio amplifier, and wherein: the acoustic signal file includes at least one frequency of the plurality of frequencies with a different amplitude than another frequency of the plurality of frequencies; or the acoustic signal file is a single file of a plurality of acoustic signal files stored in the memory of the imaging device.

In some aspects, the techniques described herein relate to a method, further including: generating, by the one or more processors, the acoustic signal file in real-time based on a frequency response curve of the imaging device.

In some aspects, the techniques described herein relate to a method, further including: capturing, by the imaging device, image data of a target object including an indicia; and analyzing, by the one or more processors, the image data to decode the indicia, wherein the acoustic signal initiation action corresponds to successfully decoding the indicia.

In some aspects, the techniques described herein relate to a method, wherein at least one frequency of the plurality of frequencies has an amplitude that is greater than at least one other frequency of the plurality of frequencies based on one or more acoustic properties of the imaging device.

In some aspects, the techniques described herein relate to a method, further including: determining a frequency response curve for the imaging device based on the imaging device emitting a plurality of test frequencies; identifying a peak of the frequency response curve; determining the acoustic signal based on the peak of the frequency response curve; determining the acoustic signal file based on the acoustic signal; and storing the frequency response curve, the peak, and the acoustic signal file in a non-overwritable location within the memory of the imaging device.

In some aspects, the techniques described herein relate to a device for providing acoustic signals, the device including: one or more processors; and a non-transitory computer-readable memory coupled to the one or more processors, the non-transitory computer-readable memory storing instructions thereon that, when executed by the one or more processors, cause the one or more processors to: receive an indication of an acoustic signal initiation action for the device; retrieve, based on the indication, an acoustic signal file from the non-transitory computer-readable memory of the device; and cause the device to emit an acoustic signal indicated by the acoustic signal file, wherein the acoustic signal includes a monotonic sweep across a plurality of frequencies that begins at a first frequency and ends at a second frequency that is different from the first frequency.

In some aspects, the techniques described herein relate to a device, wherein: the plurality of frequencies includes one or more frequencies between the first frequency and the second frequency.

In some aspects, the techniques described herein relate to a device, wherein the first frequency is less than the second frequency or the first frequency is greater than the second frequency.

In some aspects, the techniques described herein relate to a device, wherein the acoustic signal further includes a reverse monotonic sweep across the plurality of frequencies that begins at the second frequency and ends at the first frequency.

In some aspects, the techniques described herein relate to a device, wherein emitting the acoustic signal further includes: performing the monotonic sweep before the reverse monotonic sweep; or performing the reverse monotonic sweep before the monotonic sweep.

In some aspects, the techniques described herein relate to a device, wherein at least one frequency included in the plurality of frequencies corresponds to an optimal sound pressure level (SPL) amplitude for the device, and the acoustic signal file is stored in a non-overwritable location within the non-transitory computer-readable memory of the device.

In some aspects, the techniques described herein relate to a tangible machine-readable medium including instructions for providing acoustic signals that, when executed, cause a machine to at least: receive an indication of an acoustic signal initiation action for a device; retrieve, based on the indication, an acoustic signal file from a memory of the device; and cause the device to emit an acoustic signal indicated by the acoustic signal file, wherein the acoustic signal includes a monotonic sweep across a plurality of frequencies that begins at a first frequency and ends at a second frequency that is different from the first frequency.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
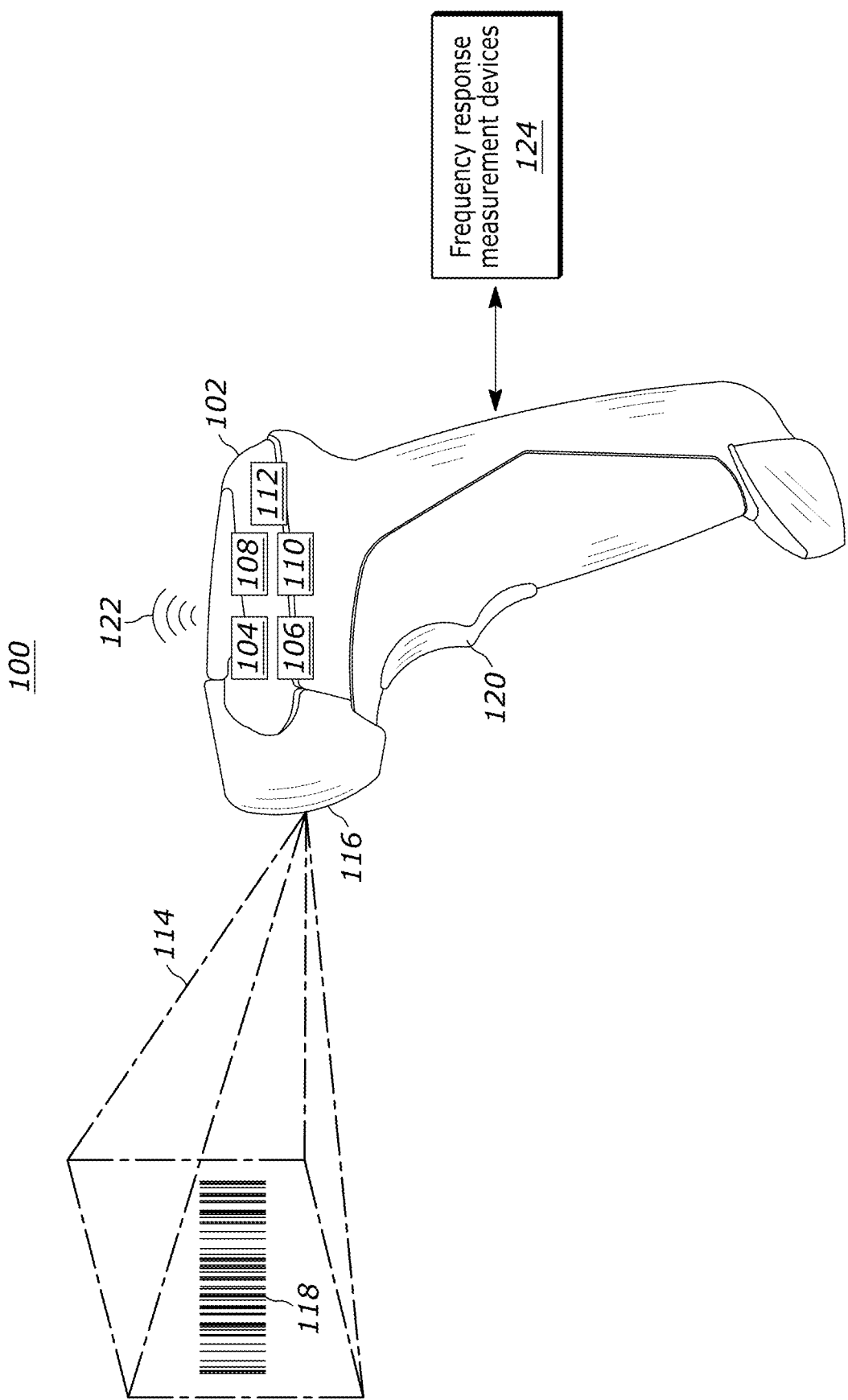
FIG. 1 depicts an example imaging device configured to provide acoustic signals, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, many imaging devices (also referenced herein as "units", "scanners", or "scanning devices") provide acoustic feedback signals, commonly known as a "beep," to indicate a successful barcode decode. Such a beep ideally satisfies SPL specifications while accounting for the acoustic effects of the imaging device physical configuration (e.g., mechanical housing, acoustic chamber) and is broad enough to create minimal unit-to-unit variation without being grating to the user. However, challenges arise where the imaging device frequency response curve is narrow and exhibits significant unit-to-unit variation, which complicates the selection of fixed tones that maintain acceptable SPL levels across all units. Further, mechanical design changes that occur late in development or after the device is released can create significant issues when there is no corresponding change to adjust the frequencies of the low/medium/high tones, such that the SPL levels can fall dramatically by the time a user attempts to use the device.

The present techniques resolve these challenges (among others) through, for example, various sweeping acoustic signals (also referenced herein as "chirps" or "chirp waveforms") configured to yield optimal SPLs for each individual imaging device and/or otherwise minimize SPL variance between/among multiple imaging devices (e.g., barcode scanners). These techniques may include receiving an indication of an acoustic signal initiation action, retrieving an acoustic signal file based on this indication, and causing the imaging device to emit an acoustic signal that includes a monotonic sweep across a range of frequencies. By sweeping across a range of frequencies that may be based on the frequency response curve(s) of a particular imaging device design, this approach addresses the challenges associated with unit-to-unit variations (e.g., due to manufacturing tolerances, design changes) that impact device acoustic properties.

Generally, a chirp waveform is not a pure tone (e.g., single frequency), as is typically used in imaging systems. Instead, a chirp is an acoustic signal where the frequency changes over time (e.g., sweeps through multiple frequencies). Moreover, each imaging device has a corresponding frequency response curve that indicates a low tone, a medium tone, and a high tone representing a range of frequencies satisfying SPL requirements/thresholds for the emitted acoustic signal. For the duration of an emitted acoustic signal, the frequency of the chirp may range from the low tone through the medium tone and the high tone, all during the single emitted acoustic signal (e.g., a single beep).

In the case of a device configuration yielding relatively narrow frequency response curves that are spread apart on a unit-by-unit basis (e.g., due to system tolerances), the chirp may span a wide enough range of frequencies to cover the peak from any/all of the individual frequency response curves. In certain instances, the chirp may sweep from low frequencies to high frequencies, vice versa, and/or may perform both low-to-high and high-to-low sweeps as a single emitted acoustic signal. Advantageously, such a chirp may be more readily perceptible by a user than a pure tone, which may correspondingly enhance the overall perceivability beyond increasing SPL alone.

In particular, these sweeping acoustic signals (chirps) generally ensure that each individual imaging device may emit at the particular frequency or set of frequencies that represent the highest SPL for that individual imaging device. This sweeping action allows the chirp to cover the peak SPL responses of varying frequency response curves, ensuring that each unit achieves maximum loudness without the need for individual calibration. Moreover, the chirp waveforms being monotonic sweep patterns introduce psychoacoustic benefits through frequency contrast, making the emitted acoustic signals more noticeable even when the SPL cannot be increased further, for example, due to power limitations.

The implementation of the chirp waveform offers several specific improvements to imaging devices. For example, it improves the device production and implementation process by eliminating the need for individual unit calibration during manufacturing. This is particularly beneficial in scenarios where system tolerances result in significant unit-to-unit variability, as the chirp waveform can adapt to these variations, ensuring consistent tone and loudness across all units. Additionally, the approach improves memory usage by storing the chirp waveform in a non-overwritable section of the device's memory, ensuring that the beep sound remains consistent even if other aspects of the device's software are updated.

In some embodiments, the present techniques include pre-warping the chirp signal. Generally, this includes adjusting the amplitude of the chirp across its frequency range to compensate for variations in the acoustic profile of different units, thereby achieving a consistent SPL across the chirp's frequency range. A single chirp sweeping across multiple frequencies may be utilized for multiple different imaging device designs, where the chirp is pre-warped to ensure that the optimal SPL ranges for each design are amplified appropriately to maximize the SPL for all devices. Thus, by pre-warping the chirp signal for each imaging device, the present techniques further enhance the consistency and perceivability of the beep sound in multiple, different imaging systems without requiring time-intensive calibration of each individual device.

Further, in certain embodiments, the present techniques include real-time generation of acoustic signal files for imaging devices, which dictates the frequencies and amplitudes of the emitted acoustic signal, based on the device's frequency response curve. This allows for a dynamic adjustment of the signal to ensure optimal performance, addressing the issue of varying acoustic properties among individual units.

Additionally, the present techniques are generally applicable to devices utilizing many different audio (acoustic) output devices. The present techniques can be implemented using different components, such as a beeper with a beeper drive circuit or a speaker with an audio amplifier. This flexibility allows the present techniques to be adapted to a wide range of devices (e.g., imaging devices), each with its unique acoustic design and requirements.

In some embodiments, the present techniques include a calibration process to find the peak of the frequency response curve for individual units. This process involves measuring the SPL for different frequencies and storing this information as calibration data, which can then be used to optimize the acoustic signal for each unit. As a result of the calibration, the present techniques can include generating, storing, and/or utilizing multiple acoustic signal files an imaging device may use to provide acoustic signals with optimal SPLs.

In accordance with the above, and with the disclosure herein, the present disclosure includes improvements in computer functionality or in improvements to other technologies at least because the present disclosure describes that, e.g., imaging devices and/or other acoustic signal systems, and their related various components, may be improved or enhanced with the disclosed methods and systems that provide easily perceivable acoustic signals (outputs). That is, the present disclosure describes improvements in the functioning of an acoustic signal system itself or "any other technology or technical field" (e.g., the field of acoustic signal systems) because the disclosed methods and devices improve and enhance operation of acoustic signal systems by introducing improved acoustic signal output techniques that reduce and/or eliminate many inefficiencies typically experienced over time by acoustic signal systems lacking such methods and devices. This improves the state of the art at least because such previous acoustic signal systems can provide imperceptible acoustic signals due to issues associated with manufacturing variances and/or other unit-to-unit differences.

In addition, the present disclosure includes applying various features and functionality, as described herein, with, or by use of, a particular machine, e.g., an scanning device and/or other hardware components as described herein.

Moreover, the present disclosure includes specific features other than what is well-understood, routine, conventional activity in the field, or adding unconventional steps that demonstrate, in various embodiments, particular useful applications, e.g., receiving, at one or more processors, an indication of an acoustic signal initiation action for an imaging device; retrieving, by the one or more processors based on the indication, an acoustic signal file from a memory of the imaging device; and/or causing, by the one or more processors, the imaging device to emit an acoustic signal indicated by the acoustic signal file, wherein the acoustic signal includes a monotonic sweep across a plurality of frequencies that begins at a first frequency and ends at a second frequency that is different from the first frequency, among others.

Further, while described herein primarily in the context of imaging devices, the techniques described herein may apply to any suitable devices in any suitable field(s).

Turning to the drawings, FIG. 1 depicts a perspective view 100 of an example imaging device 102 configured to provide acoustic signals, in accordance with embodiments described herein. The example imaging device 102 includes an imaging assembly 104, an indicia decoder 106, an audio output device 108, a processor 110, and a memory 112. The imaging assembly 104 captures image data representing a target in a field of view (FOV) 114 at least partially defined by a front-facing opening or window 116 (also referenced herein as an "optical window") of the example imaging device 102. The indicia decoder 106 is in communication with the imaging assembly 104 and is configured to receive the image data and detect/decode an indicia 118 (e.g., barcode) captured in the image data.

The processor 110 is generally configured to execute instructions stored in the memory 112. For example, the memory 112 may store audio output instructions (not shown) and a set of acoustic signal files (not shown). The audio output instructions may generally include instructions that cause the example imaging device 102 to emit (via the audio output device 108) an acoustic signal 122 when the indicia decoder 106 successfully decodes an indicia 118 captured in image data. These instructions, when executed, may cause the processor 110 to retrieve one or more acoustic signal files from the set of acoustic signal files and cause the audio output device 108 to emit an acoustic signal 122 stored and/or otherwise indicated by the one or more acoustic signal files.

The acoustic signal files are generally audio files that include digital representations and/or instructions for generating a particular acoustic signal. The configuration of the acoustic signal files may vary, for example, based on the configuration of the audio output device 108. For example, when the audio output device 108 includes a speaker drive system with an audio integrated circuit (IC), one or more acoustic signal files may be Waveform Audio File Format (WAV) files that store raw audio as waveforms with each WAV file being encoded with a specific frequency, and the audio output device 108 may play the WAV files to output the relevant acoustic signal(s). As another example, when the audio output device 108 includes a beeper and a beeper drive circuit, the acoustic signal files may include rectangle wave timing signals with a specific frequency and duty cycle to cause the beeper to output the relevant acoustic signals.

More specifically, the acoustic signals may be chirps that include a plurality of frequencies and sweep through each of those frequencies to ensure the example imaging device 102 emits at a frequency corresponding to an optimal SPL for the device 102. In this context, an "optimal" SPL may be a maximal SPL, an SPL that satisfies upper and lower sound level bounds (e.g., within a narrow acceptable range), and/or any other suitable criteria. The chirps may include any suitable number of frequencies (e.g., 2, 3, 5, 10, 25, etc.) and may generally sweep through those frequencies at any suitable rate. For example, the audio output device 108 may emit one chirp for approximately 50 milliseconds (ms) and may emit another chirp for approximately 100 ms. In those respective times, the chirps may sweep through any suitable number of frequencies, such that any chirp may also emit at a particular frequency for any suitable length of time.

As further described herein, each chirp may also sweep through the respective set of frequencies monotonically or non-monotonically and may include variable amplitudes for one or more of the frequencies included therein. For example, a chirp may cause the audio output device 108 to monotonically sweep through five separate frequencies by progressively increasing the output frequency from 2.1 Kilohertz (kHz) to 2.3 kHZ, from 2.3 kHz to 2.5 kHz, from 2.5 kHz to 2.7 kHz, and from 2.7 kHz to 2.9 kHz (referenced herein as a "forward sweep"). In this example, the chirp may have a single/constant amplitude for each of the 2.1-2.5 kHz and the 2.9 kHz frequencies but may have a relatively larger amplitude output of the 2.7 kHz frequency because that frequency corresponds to the optimal SPL for the example imaging device 102. In certain embodiments, this amplitude adjustment to the acoustic signal may be done in advance of the example imaging device's 102 use, in a process referenced herein as "pre-warping" to account for the individual acoustic characteristics/profile of the example imaging device 102.

Additionally, or alternatively, the acoustic signals may be single frequency files to be played by the audio output device 108 in response to the indicia decoder 106 successfully decoding an indicia 118. For example, an acoustic signal file may cause the audio output device 108 to output a 3 kHz acoustic signal that lasts approximately 70 ms. In another example, the audio output instructions may cause the processor 110 to retrieve multiple acoustic signal files from memory 112 and cause the audio output device 108 to play a first acoustic signal at 2.5 kHz for approximately 50 ms, pause for approximately 10 ms, and then play a second acoustic signal at 3.02 kHz for approximately 50 ms. Of course, it should be appreciated that the techniques described herein may utilize any suitable ordering, duration, and/or combination of acoustic signals.

In any event, the example imaging device 102 includes a manually actuatable trigger 120, which an operator's finger may actuate (e.g., depress) once a target falls within the imaging FOV 114 to cause the imaging assembly 104 to capture an image of the indicia 118. As a result of actuating the trigger 120, the example imaging device 102 may capture image data of the indicia 118 using the imaging assembly 104. The indicia decoder 106 may analyze this image data to identify and potentially decode the indicia 118. In the event that the indicia decoder 106 successfully decodes the indicia 118 within the captured image data, the processor 110 may execute instructions stored in the memory 112 (e.g., audio output instructions) that cause the processor 110 to retrieve and/or generate an acoustic signal file. The processor 110 then causes the audio output device 108 to emit the acoustic signal(s) 122 indicated/stored in the acoustic signal file.

The example imaging device 102 is also connected (e.g., via a network) to one or more frequency response measurement devices 124. These devices 124 are generally configured to measure the SPL response of the example imaging device 102 when emitting one or more frequencies at a constant amplitude. For example, the frequency response measurement devices 124 may be or include a testing apparatus configured to transmit a test signal to the example imaging device 102, which causes the example imaging device 102 to emit acoustic signals at a range of frequencies. The devices 124 may then measure the SPL of the emitted acoustic signals at each frequency to determine a frequency response curve and/or a peak of the frequency response curve for the example imaging device 102.

Moreover, these frequency response measurement devices 124 may also be or include instructions configured to generate acoustic signal files for storage in the example imaging device 102 memory. For example, the frequency response measurement devices 124 may include processors configured to analyze the frequency response curve of the example imaging device 102 to determine one or more frequencies, and by extension, one or more acoustic signal files for storage in the memory of the example imaging device 102 that may include a chirp or a single frequency that satisfies the SPL requirements/thresholds, as discussed herein. Additionally, or alternatively, the example imaging device 102 may determine/generate such acoustic signal files based on, for example, the frequency response curve determined by the frequency response measurement devices 124.

Figure 2:
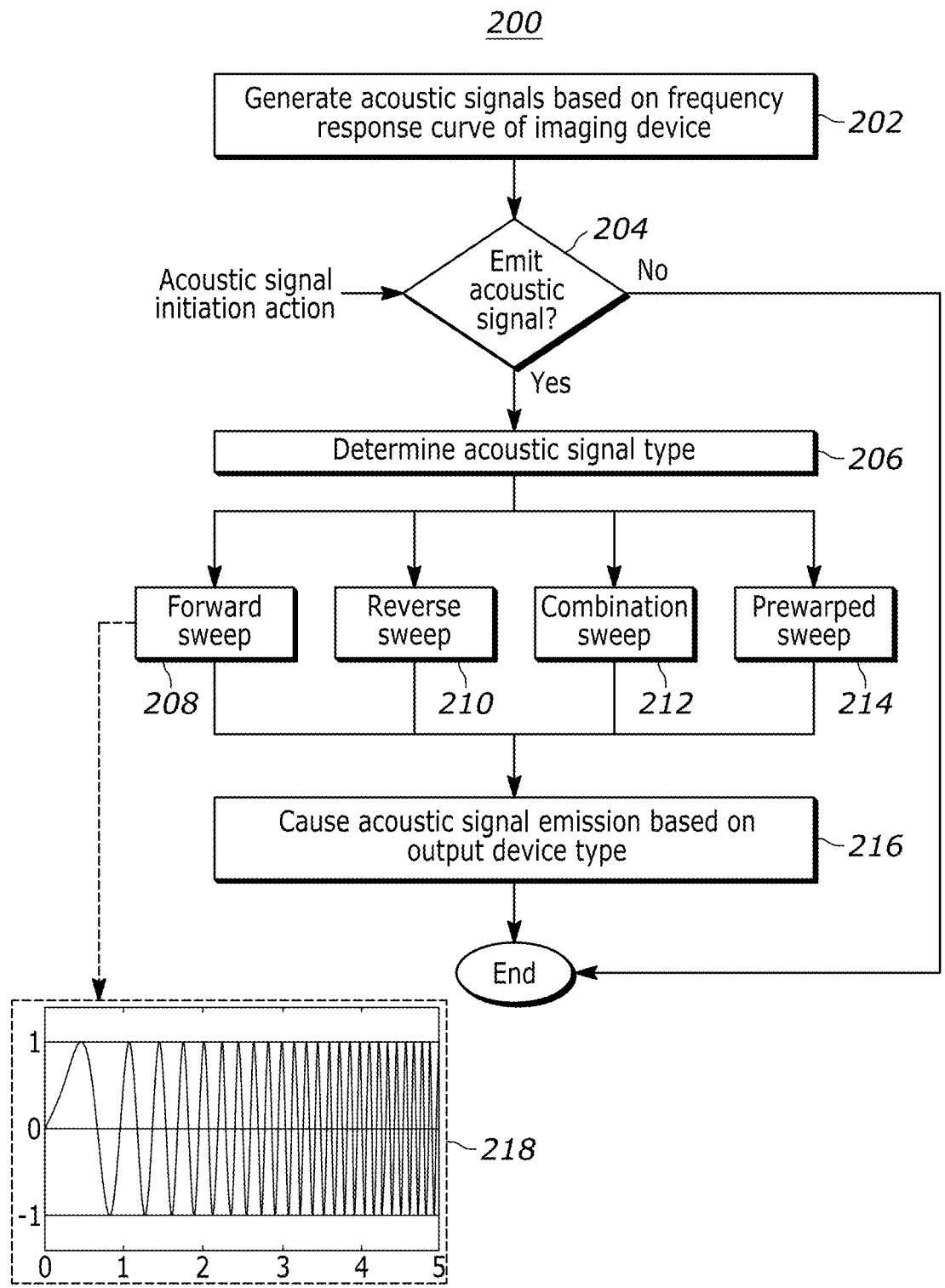
FIG. 2 is a logic flow diagram depicting the generation and emission of various sweeping acoustic signals in response to receiving/determining an indication of an acoustic signal initiation action, in accordance with embodiments described herein.

FIG. 2 is a logic flow diagram 200 depicting the generation and emission of various sweeping acoustic signals in response to receiving/determining an indication of an acoustic signal initiation action, in accordance with embodiments described herein. Generally, the diagram 200 includes generating acoustic signals for emission, determining whether to emit an acoustic signal and which acoustic signal to emit, and emitting the acoustic signal.

At block 202, a device (e.g., imaging device or other suitable device) may generate one or more acoustic signals based on a frequency response curve of the imaging device. The device may receive the frequency response curve of the imaging device and may determine a peak frequency of the frequency response curve that represents the highest SPL for the device and may further determine a range of frequencies around the peak frequency that satisfy an SPL threshold. For example, the SPL threshold may be approximately 65 decibels (dB), and an imaging device may have a frequency response curve indicating that, for a fixed power level, the device outputs frequencies within the range of 2.3-2.7 kHz at or above the SPL threshold of 65 dB. Accordingly, the device may generate one or more acoustic signals that include at least one frequency within the 2.3-2.7 kHz frequency range for the imaging device.

Generating the acoustic signals may be or include generating a chirp waveform that includes at least one frequency that satisfies the SPL threshold for the particular imaging device. For example, the imaging device (or other device) may store or otherwise have access to a set of acoustic signal files that each represent a single frequency (e.g., 2 kHz, 2.3, kHz, etc.), and the device may combine two or more of these acoustic signal files to create a new acoustic signal file that incorporates multiple frequencies. The device may incorporate two or more frequencies that satisfy the SPL threshold for any given device, and thereby ensure that the acoustic signal output by the imaging device is clearly audible to the user. Of course, it should be appreciated that the imaging device may generate the acoustic signal(s) and/or may receive generated acoustic signals from another device configured to determine acoustic signals for storage/emission by individual imaging devices.

Additionally, or alternatively, the device may generate acoustic signals without a frequency response curve of the individual imaging device. As previously mentioned, each individual unit with a given design (e.g., a single product line) may have a slightly different frequency response curve from other individual units of the same design. However, the unit-to-unit physical/acoustic variation typically does not create deviations of the unit-to-unit frequency response curve that are so significant such that sweeping through a known range of frequencies would not cause any given imaging device to emit at least one frequency that satisfies the SPL threshold. The device may therefore receive, retrieve, access, and/or otherwise utilize a frequency range to generate an acoustic signal (e.g., a chirp) that ensures each unit of a particular design will emit at least one frequency that satisfies the SPL threshold.

As an example, a particular product design may have a unit-to-unit peak SPL frequency variation that extends from approximately 2.5 kHz to approximately 2.9 kHz. The device generating the acoustic signal may generate a chirp that sweeps through frequencies extending from 2.4 kHz to 3.0 kHz (e.g., including 2.5 kHz, 2.6 kHz, 2.7 kHz, 2.8 kHz, and 2.9 kHz). In this manner, the device creates an acoustic signal that ensures each individual imaging device emits satisfactory SPL levels, regardless of the individual imaging device's frequency response curve, and thereby eliminates the need to calibrate each individual unit.

As previously mentioned, this sweeping chirp sound is generally more perceivable to a user than a pure tone of similar amplitudes, as there is more to perception than raw SPL. The changing acoustic frequency of the chirp stands out to the user's ear more than a static frequency. Additionally, the chirps described herein provide a more consistent average SPL response than the traditional pure tone, because without such a chirp, the average SPL depends entirely on the individual unit frequency response curve. While the actual waveform can be the chirps described herein, in certain embodiments, the actual waveform may be a more complex acoustic waveform that spans the same frequency range.

In any event, at block 204, the device receives an acoustic signal initiation action and determines whether to emit an acoustic signal. Generally, the acoustic signal initiation action is or includes an action that may result in the device emitting an acoustic signal in response. For example, an acoustic signal initiation action may be a successful decode of an indicia captured by the imaging device 102. Additionally, or alternatively, the acoustic signal initiation action may be or include, for example, a trigger pull of the imaging device 102, an image capture by the imaging device 102, and/or an attempted decoding of an indicia indicated in the image data captured by the imaging device 102.

Regardless, when the device determines or receives an acoustic signal initiation action, the device further determines whether to emit an acoustic signal (block 204). Continuing the prior examples, if the acoustic signal initiation action comprises an indication of a successful decode of an indicia included in image data captured by the imaging device, the device may proceed to block 206 ("Yes" branch of block 204). If the acoustic signal initiation action comprises, for example, a trigger pull of the imaging device with an unsuccessful decode of an indicia included in the captured image data or a captured image without any indicia, then the device may terminate the logic flow of the logic flow diagram 200 ("No" branch of block 204).

When the device determines to emit an acoustic signal ("Yes" branch of block 204), then the device may determine an acoustic signal type for emission (block 206). The acoustic signals available for emission may comprise a wide variety of signal waveforms and/or signal parameters. For example, the device may emit an acoustic signal that is a chirp, and the chirp may include a low-to-high forward sweep, a high-to-low frequency sweep (referenced herein as a "reverse sweep"), and/or a combination of a low-to-high and a high-to-low frequency sweep (referenced herein as a "combination sweep"). Moreover, the acoustic signals emitted by the device may also include any suitable parameters, such as a plurality of frequencies with different amplitudes and/or different durations as part of the emitted acoustic signal. In particular, an acoustic signal emitted by the device may include a frequency that has a larger amplitude than the other frequencies included as part of the acoustic signal, and this frequency may represent a peak of the device's frequency response curve (referenced herein as a "pre-warped sweep").

The device may determine which acoustic signal type to emit based on, for example, the location of the imaging device, the user operating the device, the target object corresponding to the decoded indicia, and/or any other suitable conditions or combinations thereof. As an example, the imaging device may be in a location where slightly louder than normal conditions are common, such that the beep may be particularly difficult to hear. The device may analyze this location, and when the device determines that an acoustic signal should be emitted, the device may determine that a pre-warped signal should be emitted to maximize the chance the user may hear the emitted signal.

Depending on the acoustic signal type determined by the device at block 206, the device may retrieve the relevant acoustic signal file from memory. For example, when the device determines that a forward sweep acoustic signal type should be emitted, the device may retrieve a forward sweep acoustic signal file from memory (block 208). A forward sweep acoustic signal type is generically illustrated in block 218, where the acoustic signal waveform has a varying frequency across the duration of the signal. Namely, during emission of the acoustic signal, as illustrated by proceeding along the x-axis (e.g., from time 0 to time 5), the frequency of the acoustic signal increases such that the frequency of the signal from time 0 to time 1 is smaller than the frequency of the acoustic signal from time 4 to time 5. In this example, the acoustic signal has a constant amplitude across the entire sweep.

Additionally, or alternatively, the device may determine that a reverse sweep should be emitted (block 210), a combination sweep should be emitted (block 212), or a pre-warped sweep should be emitted (block 214). It should be appreciated that the reverse sweep may have a similar waveform as the forward sweep in block 218 but may be emitted in reverse by beginning at time 5 and ending at time 0. Moreover, the combination sweep may include a forward sweep followed by a reverse sweep, or vice versa. The pre-warped sweep may have a similar sweep sequence as the forward sweep, the reverse sweep, or the combination sweep, but may also have a varying amplitude and/or other signal characteristics to account for the peak SPL frequency or other relevant acoustic characteristics of the device. For example, the pre-warped sweep may have a similar waveform as the forward sweep in block 218, except that a frequency occurring between time 2 and time 3 may have an amplitude extending beyond 1/−1 to account for that particular frequency being a peak SPL frequency for the device.

The device may further cause acoustic signal emission based on the output device type (block 216). Each imaging device may have one or more output devices (e.g., speaker, beeper, piezo transducer, etc.), which may function in different manners. For example, device speakers can play sounds from audio files, which may contain various frequencies and amplitudes to create rich and detailed audio output, and these speakers are typically driven by an amplifier that modulates power from an electrical signal to produce/emit the acoustic signal. By contrast, beepers produce a limited range of sounds, usually single-tone beeps or buzzes and are generally driven by a beeper drive circuit, which activates the beeper to emit an acoustic signal at a specific frequency or sweep of frequencies. The device may thus cause the emission of the acoustic signal indicated by the acoustic signal file by executing the relevant acoustic signal file to drive the beeper or the speaker and/or any other suitable audio output device to emit the relevant frequency or sweep of frequencies.

Figure 3:
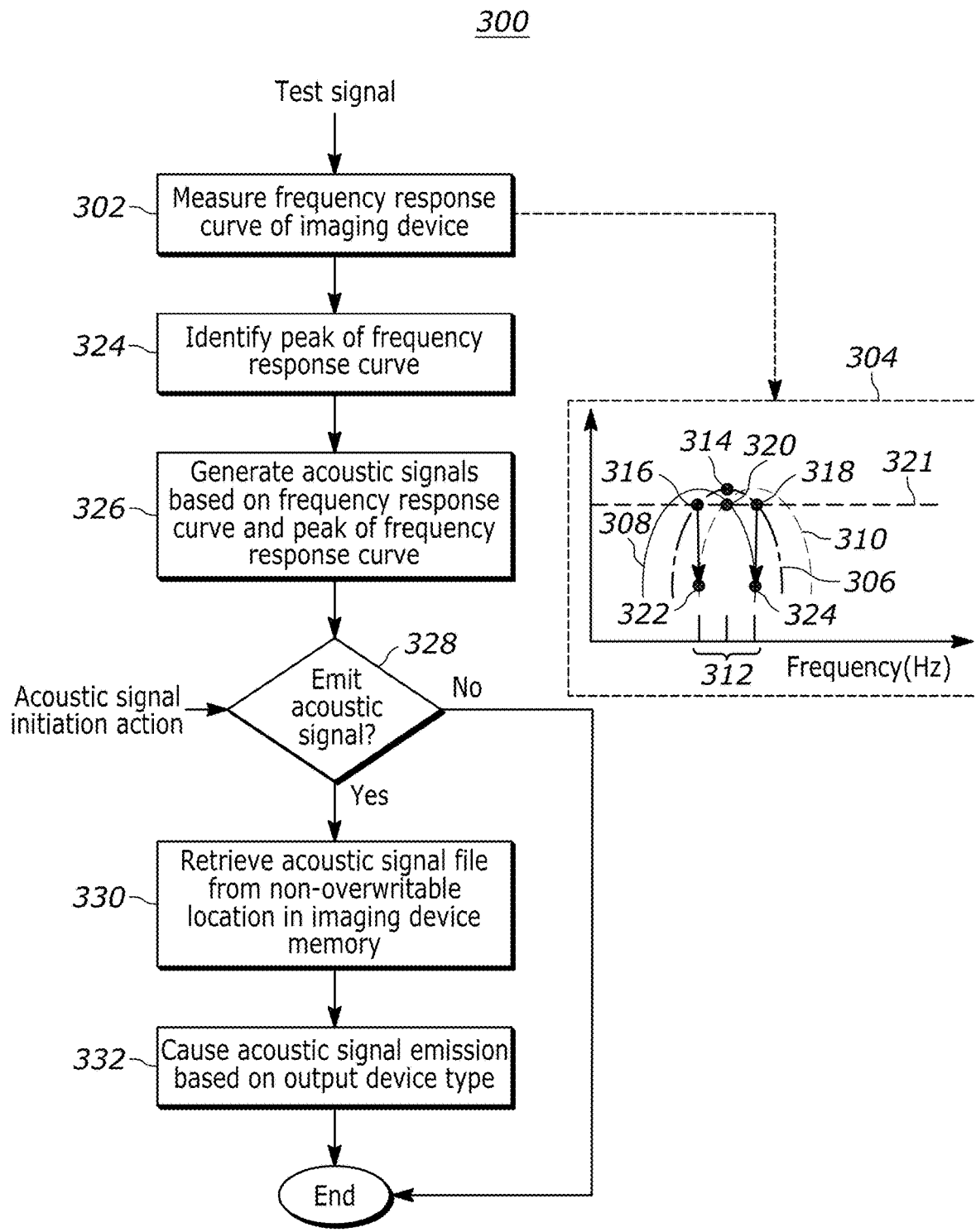
FIG. 3 is a logic flow diagram depicting acoustic signal calibration, generation, and emission of an imaging device based on a frequency response curve of the imaging device, in accordance with embodiments described herein.

FIG. 3 is a logic flow diagram 300 depicting acoustic signal calibration, generation, and emission of an imaging device based on a frequency response curve of the imaging device, in accordance with embodiments described herein. The devices described herein may initiate imaging device calibration at block 302 where the imaging device receives a test signal that causes an imaging device to emit test acoustic signals so the imaging device and/or other suitable device may measure the frequency response curve of the imaging device. In particular, the manufacturing test fixture or other suitable device(s) transmit the test signal to command/cause the imaging device to play various different frequencies and measure the SPL for each frequency to thereby trace out the frequency response curve. An example set of frequency response curves are illustrated in block 304.

As previously mentioned, some acoustic designs are more sensitive than others to system tolerances. In certain instances, as illustrated in block 304, the frequency response curve is narrow and the unit-to-unit variation in the frequency response curve is large. At block 304, the first curve 306 may represent a typical frequency response of an imaging device having a particular acoustic design, while the second curve 308 and the third curve 310 may represent extreme system tolerances that result in different resonant frequency curves for some units having the same particular acoustic design. This relatively narrow acoustic resonance width, and the corresponding larger unit-to-unit variability, increases the difficulty associated with choosing a single, fixed low tone, a medium tone, and a high tone in a manner that ensures acceptable SPL levels across all units.

For example, assume that the medium tone is chosen based on the peak 314 of the first curve 306, representing the typical frequency response curve. However, the SPL levels for imaging devices with frequency response curves corresponding to either the second curve 308 or the third curve 310 have actual SPLs at the SPL point 320 that approach the SPL threshold 321, which risks falling under the threshold and thereby may be inaudible in many circumstances. In such circumstances, either the SPL threshold 321 would need to be lowered, or the imaging device would need to be redesigned to ensure better frequency response curve alignment for all units. Both options are generally undesirable, as the SPL threshold 321 ensures audible beeps, and re-designing the imaging device is significantly resource (e.g., time, processing power, energy, equipment, etc.) prohibitive for a typical device design.

Moreover, in the case of the low tones and the high tones (represented by the SPL points 316 and 318, respectively), the SPL loss can be even more dramatic, and therefore even less acceptable. For example, as illustrated by the black arrows in block 304, the low tone (SPL point 316) and the high tone (SPL point 318) are chosen based on the first curve 306, but these frequencies correspond to dramatically lower SPL levels for at least one of the second curve 308 or the third curve 310. Namely, the frequency corresponding to the SPL point 316 corresponds to significantly smaller SPL levels (e.g., that fail to satisfy the SPL threshold 321) for the third curve 310 at the SPL point 322 and the frequency corresponding to the SPL point 318 corresponds to significantly smaller SPL levels (e.g., that fail to satisfy the SPL threshold 321) for the third curve 308 at the SPL point 324.

However, a chirp signal that sweeps through each of the frequencies corresponding to at least the peaks of the individual curves 306, 308, 310 would achieve acceptable SPL levels for all devices that share the particular acoustic design. This sweep of frequencies is generally represented by the frequency range 312, and the chirp may include other frequencies that extend beyond each of the extremes (e.g., peaks of the second/third curves 308, 310) to ensure that each peak frequency is clearly emitted during the sweep. Thus, the result of the calibration process may yield chirp signals and/or individual frequencies the imaging devices may subsequently use to emit acoustic signals that achieve acceptable SPL levels (e.g., satisfy the SPL threshold 321).

To reach this ideal chirp and/or combination of frequencies that maximize the SPL for each imaging device that conforms to any particular design/configuration, the devices described herein further identify the peak of the frequency response curve for the imaging device (block 324). The imaging device may save this peak value (e.g., as a frequency value) in a non-overwritable location in memory to ensure that the value can be referenced at any point during the device's lifespan to provide clearly audible acoustic signals without being overwritten (e.g., during firmware updates). This stored peak value may then, for example, be used as a calibrated parameter for application of the peak frequency to the audio output device drive circuit.

Thus, based on the frequency response curve for a particular imaging device and/or the peak of the frequency response curve, the devices described herein may generate one or more acoustic signals/signal files (block 326). For example, the devices described herein may determine one or more acoustic signals that, when emitted by the imaging device, would provide SPLs that satisfy the SPL threshold(s) (e.g., SPL threshold 321). Such acoustic signals may be single frequencies (e.g., corresponding to the peak of the frequency response curve) and/or may include a chirp with multiple frequencies emitted in a sweep pattern. As an example, the chirps generated may sweep from the frequency corresponding to SPL value 316 to the frequency corresponding to the SPL value 318.

As mentioned, the particular characteristics of the acoustic signal files may be dependent on the configuration of the audio output device included as part of the imaging device. For example, the devices described herein may generate square waveforms with a frequency matching the calibrated peak frequency value as acoustic signal files for an imaging device incorporating a beeper as the audio output device. The acoustic signal file containing this square waveform is retrieved from memory and provided at the input of the imaging device beeper drive circuit to cause the beeper to output the acoustic signal represented by the acoustic signal file.

Some imaging devices may include a speaker and an audio amplifier (e.g., a class-D audio amplifier) as the audio output device. In these instances, the acoustic signal files may include various different waveforms and/or be implemented in several manners. For example, the devices described herein (e.g., a manufacturing test fixture) may utilize a database of acoustic signal files (e.g., WAV files), with fixed frequencies and different amplitudes. After these devices identify the peak of the individual imaging device frequency response curve, the devices may provide the acoustic signal file corresponding to (or most closely corresponding to) the peak value to the imaging device, which may store the acoustic signal file in a non-overwritable region of memory (e.g., protected for calibration parameters).

Additionally, or alternatively, the devices described herein may generate these acoustic signal files in real-time (e.g., seconds) after measuring the frequency response curve. These devices may adjust either the frequency and/or the amplitude in the acoustic signal file of frequencies that may maximize the SPL for the imaging device (e.g., based on the peak of the frequency response curve), to avoid some imaging devices being quieter than others due to system tolerances and/or shifting resonant peaks. Thus, this method ensures overall SPL level consistency between imaging devices having a same design using only a single frequency per imaging device.

In another embodiment, the devices described herein may save sets of acoustic signal files to the imaging device memory for subsequent retrieval and emission. Each acoustic signal file saved as part of these sets may represent a frequency that corresponds to a commonly occurring peak of the particular acoustic design of the imaging devices. The devices described herein may determine these commonly occurring peaks based on calibration of a subset of devices having the particular acoustic design, and/or from predictive analysis of the acoustic design(s). The devices described herein may then cause an individual imaging device to emit the acoustic signals represented by the sets of acoustic signal files to determine which of these acoustic signals produces the highest SPL. When the devices described herein determine which acoustic signal file(s) produces the highest SPL, the imaging device may delete the remaining acoustic signal files that did not yield comparatively high SPLs. In this manner, the imaging device may maximize the memory resources required to achieve satisfactory SPLs by only briefly storing the entire set of acoustic signal files before deleting those files that did not yield satisfactory SPLs for the particular imaging device.

Regardless, the imaging device may store acoustic signal files for execution, and the imaging device may receive an indication of an acoustic signal initiation action. The imaging device may then determine whether to emit an acoustic signal (block 328). If the indication of the acoustic signal initiation action indicates, for example, a successful indicia decode ("Yes" branch of block 328), the imaging device may proceed to block 330 to retrieve an acoustic signal file from the non-overwritable location in the imaging device's memory. However, if the indication of the acoustic signal initiation action indicates, for example, an unsuccessful indicia decode ("No" branch of block 328), the imaging device may proceed to terminate the logic flow of the logic flow diagram 300, as no acoustic signal emission is actually required.

When the imaging device determines emitting an acoustic signal is appropriate ("Yes" branch of block 328), the imaging device retrieves an acoustic signal file from the non-overwritable portion of the imaging device's memory (block 330) and causes an emission of the acoustic signal based on the specific configuration of the audio output device (block 332). For example, if the audio output device is a beeper, the imaging device may drive the beeper drive circuit using a square waveform to emit the relevant acoustic signal. Alternatively, if the audio output device is a speaker and audio amplifier, the imaging device may execute one or more WAV files to cause the speaker to output the relevant acoustic signal.

Figure 4:
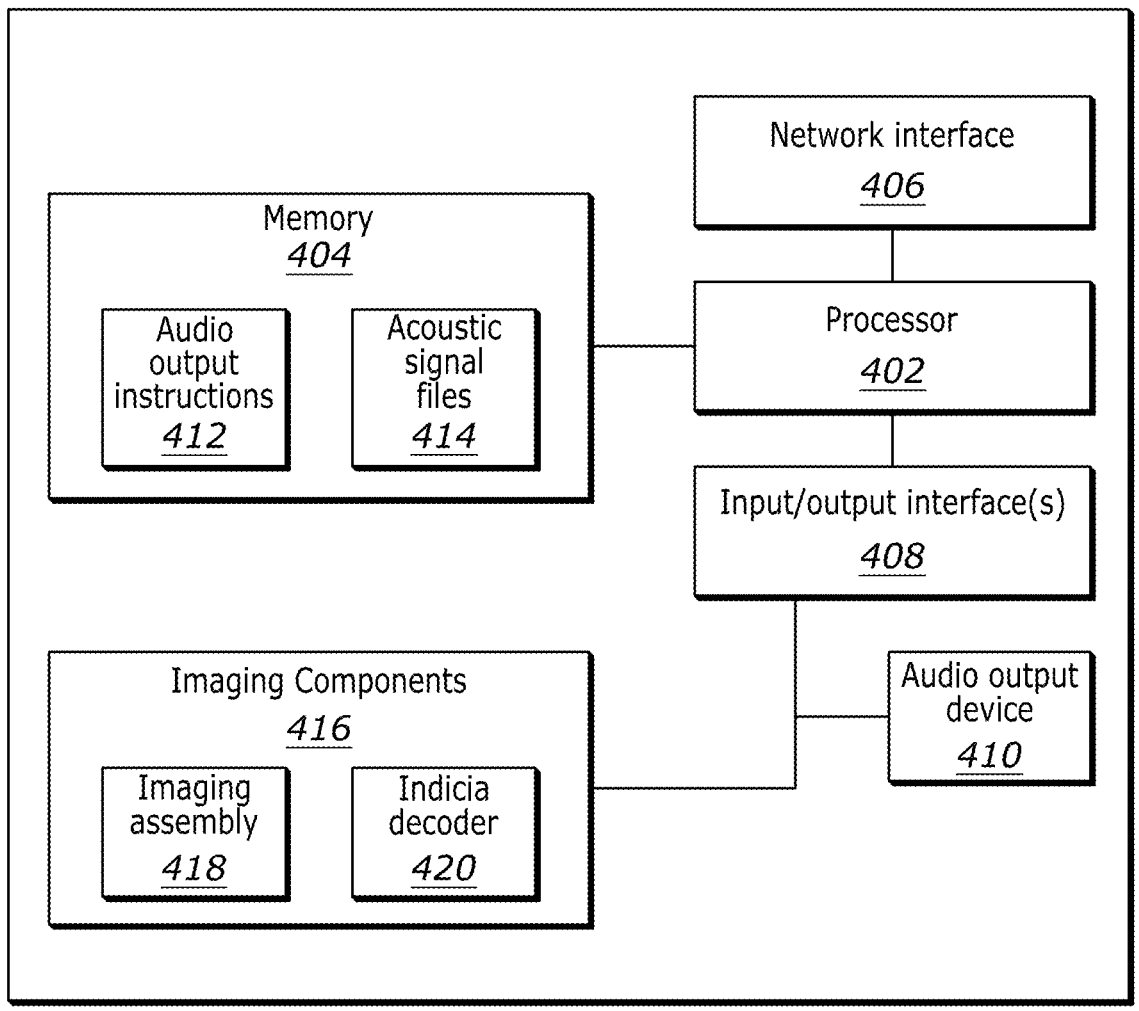
FIG. 4 is a block diagram of an example logic circuit for implementing example methods and/or operations described herein.

FIG. 4 is a block diagram representative of an example logic circuit capable of implementing, for example, the example imaging device 102 of FIG. 1. The example logic circuit of FIG. 4 is a processing platform 400 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 400 of FIG. 4 includes a processor 402 such as, for example, one or more microprocessors, controllers, and/or any suitable type of processor. The example processing platform 400 of FIG. 4 includes memory (e.g., volatile memory, non-volatile memory) 404 accessible by the processor 402 (e.g., via a memory controller). The example processor 402 interacts with the memory 404 to obtain, for example, machine-readable instructions stored in the memory 404 corresponding to, for example, the operations represented by the flowchart(s) of this disclosure. Additionally, or alternatively, machine-readable instructions corresponding to the example operations described herein may be stored on one or more removable media (e.g., a compact disc (CD), a digital versatile disc (DVD), removable flash memory, etc.) that may be coupled to the processing platform 400 to provide access to the machine-readable instructions stored thereon.

The example processing platform 400 of FIG. 4 includes one or more communication interfaces such as, for example, one or more network interfaces 406, and/or one or more input/output (I/O) interfaces 408. The communication interface(s) may enable the processing platform 400 of FIG. 4 to communicate with, for example, another device, system, host system (e.g., an inventory management system, a POS station, etc.), datastore, database, and/or any other machine.

The example processing platform 400 of FIG. 4 may include the network interface(s) 406 to enable communication with other machines (e.g., an inventory management system, a POS station, etc.) via, for example, one or more networks. The example network interface(s) 406 include any suitable type of communication interface(s) (e.g., wired and/or wireless interfaces) configured to operate in accordance with any suitable communication protocol(s). Example network interfaces 406 include a TCP/IP interface, a Wi-Fi™ transceiver (e.g., according to the IEEE 802.11× family of standards), an Ethernet transceiver, a cellular network radio, a satellite network radio, or any other suitable interface based on any other suitable communication protocols or standards.

The example, processing platform 400 of FIG. 4 may include the input/output (I/O) interface(s) 408 (e.g., a Bluetooth® interface, a near-field communication (NFC) interface, a universal serial bus (USB) interface, a serial interface, an infrared interface, etc.) to (1) enable receipt of user input (e.g., from the trigger 120 of FIG. 1, a touch screen, keyboard, mouse, touch pad, joystick, trackball, microphone, button, etc.), (2) communicate output data (e.g., mode change confirmations, visual indicators, instructions, data, images, etc.) to the user (e.g., via an audio output device 410, speaker, printer, haptic device, etc.), and/or (3) interact with other components of the processing platform 400 (e.g., a set of imaging components 416, the audio output device 410, etc.). The audio output device 410 may include a beeper (e.g., including a beeper drive circuit), a speaker, a piezo transducer, and/or any other suitable audio devices or combinations thereof.

To memory 404 stores audio output instructions 412 and a set of acoustic signal files 414, which may enable performance of various acoustic signal output functionalities described herein. For example, the processor 402 may access the memory 404 to execute the audio output instructions 412. When the processor 402 successfully decodes a barcode or other indicia captured in an image by an imaging device, the audio output instructions 412 may cause the processor 402 to retrieve an acoustic signal file from the set of acoustic signal files 414 and execute/run the acoustic signal file to emit the acoustic signal included in and/or otherwise represented by the file via the audio output device 410.

To capture images of objects and/or indicia (e.g., barcodes) on objects, the example processing platform 400 includes the set of imaging components 416. The set of imaging components 416 includes the imaging assembly 418 under control of, for example, the processor 402 to capture image frames representative of the portion of an environment in which the example imaging device 102 is operating that falls within the imaging FOV 114 of the set of imaging components 416. The imaging assembly 418 includes a plurality of photosensitive elements forming a substantially flat surface. The processor 402 may be communicatively coupled to the set of imaging components 416 via the input/output (I/O) interface(s) 408.

The example set of imaging components 416 may also include any number and/or type(s) indicia decoders 420 to detect and/or decode indicia to determine the payload of the indicia. In some aspects, the indicia decoder 420 is implemented by the processor 402. The indicia decoder 420, e.g., via the processor 402, conveys the payload of decoded indicia to a host system via a communication interface such as the network interface(s) 406 and/or the I/O interface(s) 408, which may also cause the processor 402 to retrieve one or more files from the set of acoustic signal files 414 based on the audio output instructions 412.

Of course, it should be appreciated that, while the various components of the example processing platform 400 (e.g., processors 402, memory 404, etc.) are illustrated in FIG. 4 as single components, the example processing platform 400 may include multiple of each of the components.

Figure 5:
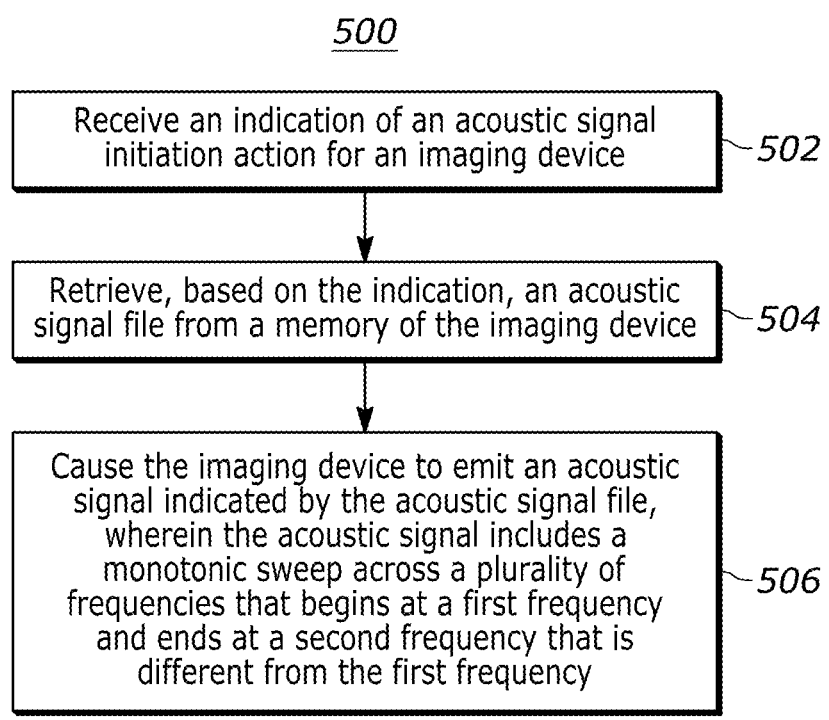
FIG. 5 is a flowchart representative of various methods for providing acoustic signals, in accordance with embodiments described herein.

FIG. 5 is a flowchart representative of a method 500 for providing acoustic signals, in accordance with embodiments described herein. It is to be understood that any of the steps of the method 500 may be performed by, for example, the imaging device 102, and/or any other suitable components, components contained therein, and/or combinations thereof discussed herein.

At block 502, the method 500 includes receiving an indication of an acoustic signal initiation action for an imaging device. The method 500 further includes retrieving, based on the indication, an acoustic signal file from a memory of the imaging device (block 504). The method 500 further includes causing the imaging device to emit an acoustic signal indicated by the acoustic signal file (block 506). The acoustic signal includes a monotonic sweep across a plurality of frequencies that begins at a first frequency and ends at a second frequency that is different from the first frequency.

In some embodiments, the plurality of frequencies includes one or more frequencies between the first frequency and the second frequency.

In some embodiments, the first frequency is less than the second frequency or the first frequency is greater than the second frequency.

In some embodiments, the acoustic signal further includes a reverse monotonic sweep across the plurality of frequencies that begins at the second frequency and ends at the first frequency.

In some embodiments, emitting the acoustic signal further includes: performing the monotonic sweep before the reverse monotonic sweep; or performing the reverse monotonic sweep before the monotonic sweep.

In some embodiments, at least one frequency included in the plurality of frequencies corresponds to an optimal sound pressure level (SPL) amplitude for the imaging device.

In some embodiments, the acoustic signal file is stored in a non-overwritable location within the memory of the imaging device.

In some embodiments, the imaging device includes a beeper and a beeper drive circuit, and the method 500 further includes causing, by the one or more processors based on the acoustic signal file, the beeper to emit the acoustic signal by providing a plurality of square waves with frequencies corresponding to the plurality of frequencies as inputs to the beeper drive circuit.

In some embodiments, the imaging device includes a speaker and an audio amplifier, and the acoustic signal file includes at least one frequency of the plurality of frequencies with a different amplitude than another frequency of the plurality of frequencies; or the acoustic signal file is a single file of a plurality of acoustic signal files stored in the memory of the imaging device.

In some embodiments, the method 500 further includes generating, by the one or more processors, the acoustic signal file in real-time based on a frequency response curve of the imaging device.

In some embodiments, the method 500 further includes capturing, by the imaging device, image data of a target object including an indicia; and analyzing, by the one or more processors, the image data to decode the indicia, wherein the acoustic signal initiation action corresponds to successfully decoding the indicia.

In some embodiments, at least one frequency of the plurality of frequencies has an amplitude that is greater than at least one other frequency of the plurality of frequencies based on one or more acoustic properties of the imaging device.

In some embodiments, the method 500 further includes determining a frequency response curve for the imaging device based on the imaging device emitting a plurality of test frequencies; identifying a peak of the frequency response curve; determining the acoustic signal based on the peak of the frequency response curve; determining the acoustic signal file based on the acoustic signal; and storing the frequency response curve, the peak, and the acoustic signal file in a non-overwritable location within the memory of the imaging device.

Of course, it is to be appreciated that the actions of the method 500 may be performed any suitable number of times, and that the actions described in reference to the method 500 may be performed in any suitable order.

ADDITIONAL CONSIDERATIONS

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A method for providing acoustic signals, the method comprising:
   receiving, at one or more processors, an indication of an acoustic signal initiation action for an imaging device;
   retrieving, by the one or more processors based on the indication, an acoustic signal file from a memory of the imaging device; and
   causing, by the one or more processors, the imaging device to emit an acoustic signal indicated by the acoustic signal file, wherein the acoustic signal includes a monotonic sweep across a plurality of frequencies that begins at a first frequency and ends at a second frequency that is different from the first frequency.

2. The method of claim 1, wherein the plurality of frequencies includes one or more frequencies between the first frequency and the second frequency.

3. The method of claim 1, wherein the first frequency is less than the second frequency or the first frequency is greater than the second frequency.

4. The method of claim 1, wherein the acoustic signal further includes a reverse monotonic sweep across the plurality of frequencies that begins at the second frequency and ends at the first frequency.

5. The method of claim 4, wherein emitting the acoustic signal further comprises:
   performing the monotonic sweep before the reverse monotonic sweep; or
   performing the reverse monotonic sweep before the monotonic sweep.

6. The method of claim 1, wherein at least one frequency included in the plurality of frequencies corresponds to an optimal sound pressure level (SPL) amplitude for the imaging device.

7. The method of claim 1, wherein the acoustic signal file is stored in a non-overwritable location within the memory of the imaging device.

8. The method of claim 1, wherein the imaging device includes a beeper and a beeper drive circuit, and the method further comprises:
   causing, by the one or more processors based on the acoustic signal file, the beeper to emit the acoustic signal by providing a plurality of square waves with frequencies corresponding to the plurality of frequencies as inputs to the beeper drive circuit.

9. The method of claim 1, wherein the imaging device includes a speaker and an audio amplifier, and wherein:
   the acoustic signal file includes at least one frequency of the plurality of frequencies with a different amplitude than another frequency of the plurality of frequencies; or
   the acoustic signal file is a single file of a plurality of acoustic signal files stored in the memory of the imaging device.

10. The method of claim 9, further comprising:
    generating, by the one or more processors, the acoustic signal file in real-time based on a frequency response curve of the imaging device.

11. The method of claim 1, further comprising:
    capturing, by the imaging device, image data of a target object including an indicia; and
    analyzing, by the one or more processors, the image data to decode the indicia, wherein the acoustic signal initiation action corresponds to successfully decoding the indicia.

12. The method of claim 1, wherein at least one frequency of the plurality of frequencies has an amplitude that is greater than at least one other frequency of the plurality of frequencies based on one or more acoustic properties of the imaging device.

13. The method of claim 1, further comprising:
    determining a frequency response curve for the imaging device based on the imaging device emitting a plurality of test frequencies;
    identifying a peak of the frequency response curve;
    determining the acoustic signal based on the peak of the frequency response curve;
    determining the acoustic signal file based on the acoustic signal; and
    storing the frequency response curve, the peak, and the acoustic signal file in a non-overwritable location within the memory of the imaging device.

14. A device for providing acoustic signals, the device comprising:

one or more processors; and a non-transitory computer-readable memory coupled to the one or more processors, the non-transitory computer-readable memory storing instructions thereon that, when executed by the one or more processors, cause the one or more processors to:
- receive an indication of an acoustic signal initiation action for the device;
- retrieve, based on the indication, an acoustic signal file from the non-transitory computer-readable memory of the device; and
- cause the device to emit an acoustic signal indicated by the acoustic signal file, wherein the acoustic signal includes a monotonic sweep across a plurality of frequencies that begins at a first frequency and ends at a second frequency that is different from the first frequency.

15. The device of claim 14, wherein:
the plurality of frequencies includes one or more frequencies between the first frequency and the second frequency.

16. The device of claim 14, wherein the first frequency is less than the second frequency or the first frequency is greater than the second frequency.

17. The device of claim 14, wherein the acoustic signal further includes a reverse monotonic sweep across the plurality of frequencies that begins at the second frequency and ends at the first frequency.

18. The device of claim 17, wherein emitting the acoustic signal further comprises:
- performing the monotonic sweep before the reverse monotonic sweep; or
- performing the reverse monotonic sweep before the monotonic sweep.

19. The device of claim 14, wherein at least one frequency included in the plurality of frequencies corresponds to an optimal sound pressure level (SPL) amplitude for the device, and the acoustic signal file is stored in a non-overwritable location within the non-transitory computer-readable memory of the device.

20. A tangible machine-readable medium comprising instructions for providing acoustic signals that, when executed, cause a machine to at least:
- receive an indication of an acoustic signal initiation action for a device;
- retrieve, based on the indication, an acoustic signal file from a memory of the device; and
- cause the device to emit an acoustic signal indicated by the acoustic signal file, wherein the acoustic signal includes a monotonic sweep across a plurality of frequencies that begins at a first frequency and ends at a second frequency that is different from the first frequency.

* * * * *